(12) United States Patent (10) Patent No.: US 12,613,665 B2
Pan (45) Date of Patent: Apr. 28, 2026

(54) PROCESSING METHOD AND DEVICE THEREOF

(71) Applicant: Lenovo (Beijing) Limited, Beijing (CN)

(72) Inventor: Shouren Pan, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/753,847

(22) Filed: Jun. 25, 2024

(65) Prior Publication Data

US 2024/0427543 A1 Dec. 26, 2024

(30) Foreign Application Priority Data

Jun. 26, 2023 (CN) .......................... 202310760045.8

(51) Int. Cl.
G09G 5/00 (2006.01)
G06F 3/14 (2006.01)
G06V 10/25 (2022.01)
(52) U.S. Cl.
CPC ................ G06F 3/14 (2013.01); G06V 10/25 (2022.01)

(58) Field of Classification Search
CPC .......... G06F 3/14; G06V 10/25; G06V 10/70; G06V 40/165; G06T 3/40
USPC ......................................................... 345/156
See application file for complete search history.

(56) References Cited

U.S. PATENT DOCUMENTS

| | | | |
|---|---|---|---|
| 2016/0035074 A1* | 2/2016 | Jeong | ...................... G06T 11/60 |
| | | | 382/282 |
| 2017/0279983 A1* | 9/2017 | Mizutani | ............... G06F 3/1236 |
| 2022/0398995 A1* | 12/2022 | Wang | ..................... G09G 5/024 |
| 2024/0420397 A1* | 12/2024 | Dong | ..................... G06T 13/00 |

* cited by examiner

*Primary Examiner* — Jennifer T Nguyen
(74) *Attorney, Agent, or Firm* — ANOVA LAW GROUP, PLLC

(57) ABSTRACT

A processing method includes displaying a target image including a target area based on first data to present the target image with a first effect, determining second data based on the target area, and displaying the target image based on the second data to present the target image with a second effect. The first data and the second data are stored in association with the target image, and the first data and the second data are generated before the target image is displayed.

12 Claims, 6 Drawing Sheets

Display a first target image based on first data, to present the first target image with a first effect    S101

Determine second data based on the first target area    S102

Display the first target image based on the second data, to presents the first target image with a second effect    S103

PROCESSING METHOD AND DEVICE THEREOF

CROSS-REFERENCE TO RELATED APPLICATION

This application claims priority to Chinese Patent Application No. 202310760045.8, filed on Jun. 26, 2023, the entire content of which is incorporated herein by reference.

TECHNICAL FIELD

The present disclosure generally relates to the field of image processing technologies and, more particularly, to a processing method and device.

BACKGROUND

With the development of mobile devices, camera parameters of mobile devices such as mobile phones and iPads are constantly upgraded to optimize the photographing performance of mobile devices. However, the existing image display methods of mobile devices are relatively monotonous, which affects users' experience.

Therefore, how to improve users' experience has become an urgent problem to be solved.

SUMMARY

In accordance with the present disclosure, there is provided a processing method including displaying a target image including a target area based on first data to present the target image with a first effect, determining second data based on the target area, and displaying the target image based on the second data to present the target image with a second effect. The first data and the second data are stored in association with the first target image, and the first data and the second data are generated before the first target image is displayed.

Also in accordance with the present disclosure, there is provided a processing method including determining an operating parameter of a photographing module in response to detecting that a target area meeting a preset condition exists, and controlling the photographing module to perform photographing based on the operating parameter of the photographing module to obtain data corresponding to the target area. The operating parameter of the photographing module at least includes an operating parameter of a light-emitting unit. An illuminated space of the light-emitting unit partially coincides with a photographing space of the photographing module. The illuminated space of the light-emitting unit at least includes a space corresponding to the target area.

Also in accordance with the present disclosure, there is provided an electronic device including at least one processor; and at least one memory storing at least one program that, when executed by the at least one processor, causes the at least one processor to display a target image including a target area based on first data to present the target image with a first effect, determine second data based on the target area, and display the target image based on the second data to present the target image with a second effect. The first data and the second data are stored in association with the first target image, and the first data and the second data are generated before the first target image is displayed.

DETAILED DESCRIPTION OF THE EMBODIMENTS

Specific embodiments of the present disclosure are hereinafter described with reference to the accompanying drawings. The described embodiments are merely examples of the present disclosure and should not be regarded as limitations of this application. All other embodiments obtained by those of ordinary skill in the art without creative efforts fall within the scope of protection of the present disclosure.

Image display methods of existing mobile devices are relatively monotonous, and additional filter data needs to be added to target images to change display effects of the images. The effects are unrealistic and user experience is affected. To improve the user experience, the present disclosure provides a processing method and a processing device. In the present disclosure, multiple pieces of effect data stored in association with a target image may be called to achieve switching display with different real-life effects, and also switching to display the presentation effect of a certain target area may be achieved. The processing method provided by the present disclosure may be applied to any electronic device that is able to implement image processing and image display, including but not limited to computers, mobile phones, tablets, etc.

Figure 1:
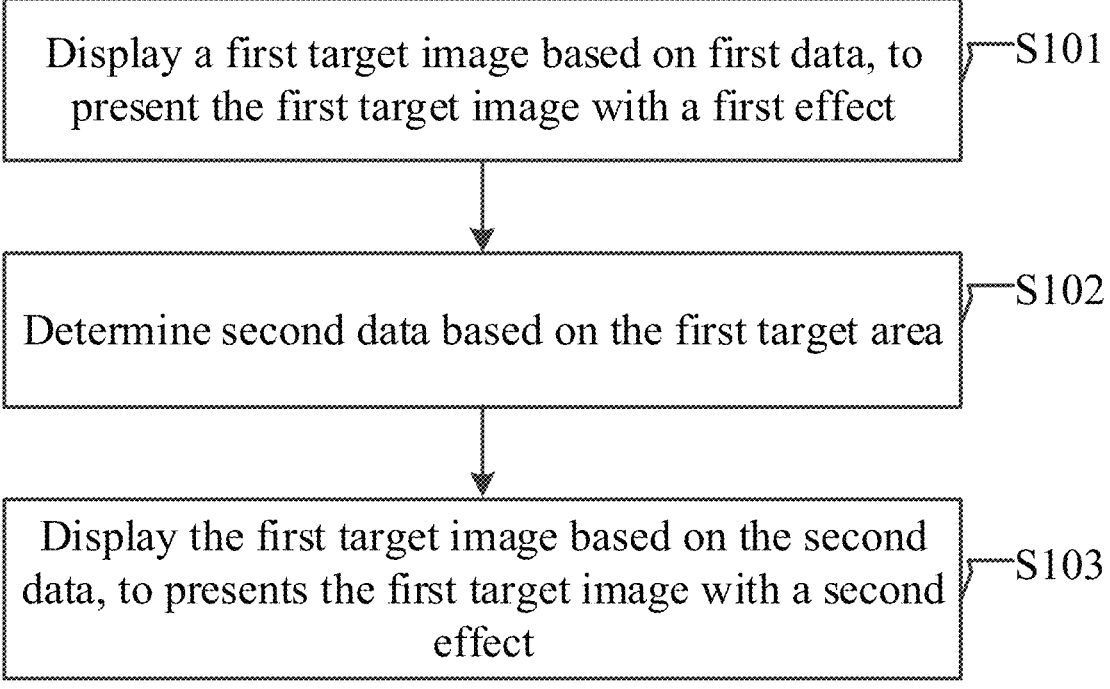
FIG. 1 is a flowchart of a processing method consistent with the present disclosure.

The present disclosure provides a processing method. As shown in FIG. 1, which is a flowchart of the processing method, in one embodiment, the processing method includes S101 to S103.

At S101, a first target image is displayed based on first data such that the first target image is presented with a first effect.

In one embodiment, the first target image may include a first target area.

In one embodiment, the first data may be image data corresponding to one image in a pre-photographed image group including a plurality of images or image data corresponding to one image in image data obtained by merging a plurality of images.

For example, in one embodiment, a plurality of images may be captured in advance, and the plurality of images may be written as data in a standard image file format (BMP) format, an extreme memory profile (Xmp) format or a custom format to be merged and saved, and any one group may be used as the first data. Or, in another embodiment, the plurality of images may be determined as one image group, and any one of the plurality of images may be used as the first data. An electronic device may read the first data and display the first target image according to the first data, that is, present the first target image on a display interface with the first effect.

The first target image may be an image displayed on the display interface of the electronic device. For example, the image displayed after a user clicks on a mobile phone album may be determined as the first target image. The first target area included in the first target image may be an area corresponding to one target object in the first image, or may be an area selected by the user in the first target image. The target object may include but is not limited to human images, animal images, building images or street sign images in the first image.

The first effect may include, but is not limited to, image effects photographed under natural light or image effects photographed by a photographing module under different operating parameters. For example, the first effect may include highlighting a certain area in the first target image. In another embodiment, the first effect may include an effect obtained by enhancing the brightness of the certain area for photographing, or obtained by blurring the area other than the certain area for photographing.

At S102, second data is determined according to the first target area.

In one embodiment, the first target area may be determined in the first target image according to the user's selection, and then the second data corresponding to the first target area may be determined. In one embodiment, determining the first target area may include: detecting an area corresponding to a received first operation signal on the first target image, and determining this area as the first target area. The first operation signal may be an operation signal for selecting the first target area. For example, the first operation signal may be an operation signal generated when the user clicks on an object in the first target image.

In another embodiment, determining the first target area may also include: detecting each object in the first target image, and determining an area where the target object is located as the first target area. For example, the target object may be set to a kitten. When the first target image is detected to include three objects of a cat A1, a dog A2, and a building A3, the image area where the cat A1 is located may be determined as the first target area. In another embodiment, the user's triggering operation on the first target image may be monitored, and the operation signal indicating that the user selects an image area may be obtained, such that the image area is determined as the first target area. For example, the first target image may include an image of a person A and an image of an animal B. When the user clicks on the head image area of the person A, the image area corresponding to the person A in the first target image may be determined as the first target area. In another embodiment, an identifier list of one or more object identifiers included in the first target image may be displayed to the user for the user to select an object, and the image area corresponding to the object identifier selected by the user may be determined as the first target area. In one embodiment, one object identifier may be an object icon, a preset object number, a preset object identifier, an object type, an area division list in the first target image, or an edge area in the first target image, corresponding to one object. Each object identifier may correspond to an image area in the first target image. In another embodiment, each object identifier may correspond to a specified position in the first target image, and the specified position may be used as a center of a circle to determine the image area with a preset length as a radius, such that this image area may be used as the image area corresponding to the corresponding object identifier. When the user clicks on one object identifier in the identifier list or clicks on any position in one image area corresponding to one object identifier, the image area corresponding to the object identifier may be determined as the first target area. The radius length may be preset according to the application scenario and the present disclosure has no specific limitation on this.

Figure 2:
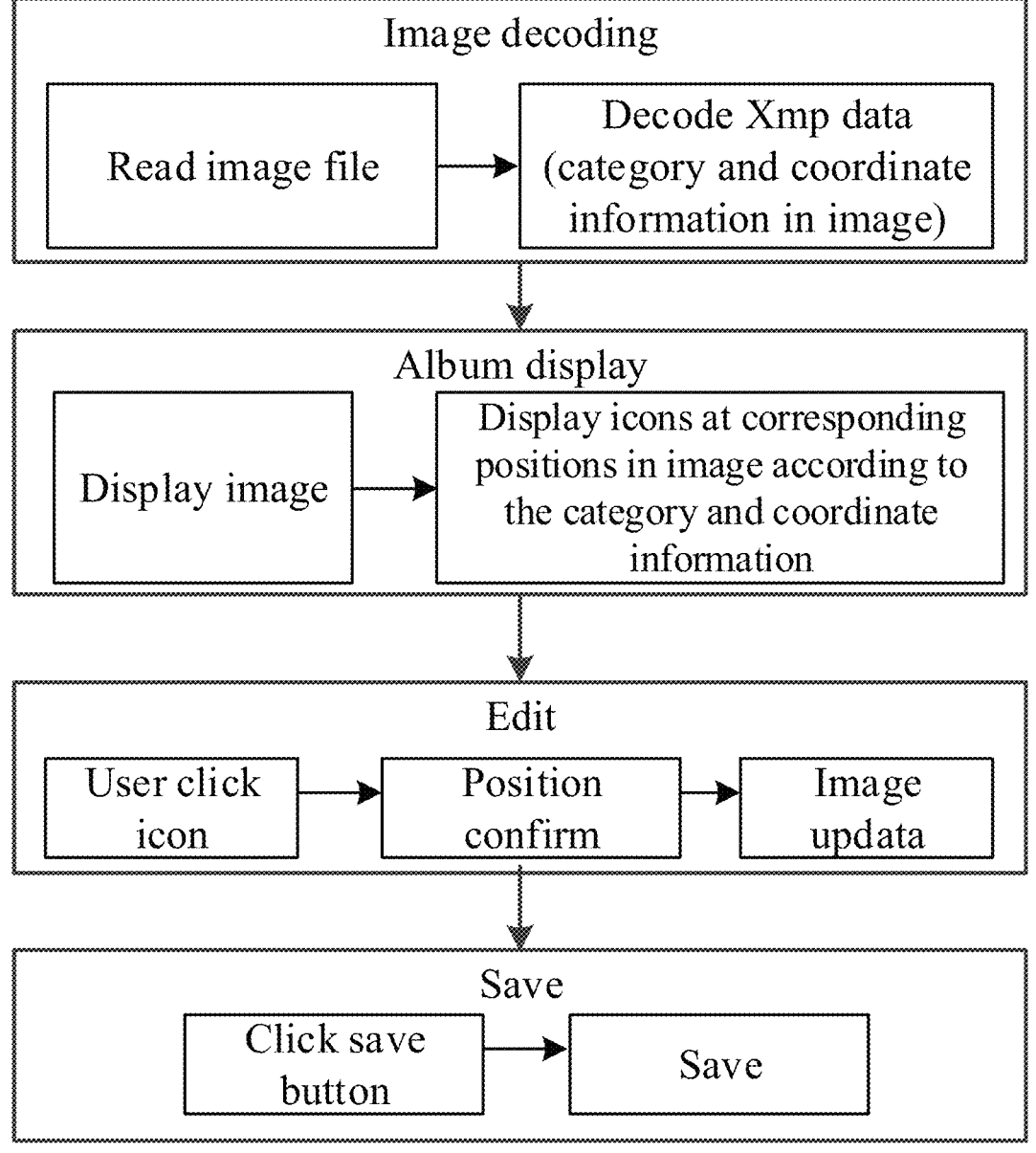
FIG. 2 is a schematic diagram showing determination of a target region consistent with the present disclosure.

In one embodiment shown in FIG. 2, which is a schematic diagram showing determination of the target area, determining the first target area also includes before displaying the first target image, the image display interface of the electronic device first performs an image decoding operation. For example, the target image file may be read and the Xmp data of the target image file may be decoded. The decoded Xmp data may include data including images, categories or coordinates of objects, etc. For example, one image of one image group including a plurality of images pre-photographed or the image data obtained by merging a plurality of images may be encoded into BMP format data, Xmp format data or custom format data and then saved to the electronic device. Therefore, the electronic device may read a set of image data from one image of the image group including the plurality of images pre-photographed or the image data obtained by merging the plurality of images (the read image data set may be a first data set corresponding to the first target image) for decoding. For example, when the image data is encoded and stored in Xmp format, the Xmp format data decoding may be performed on the read image data set to obtain a decoded image, and also the category and coordinate information of each object in the image may be obtained by decoding. After decoding the category and coordinate information of each object in the image, the electronic device may use the category and coordinate information of each object as an icon corresponding to each object based on the image, and display icons in the image display interface (such as a photo album) of the electronic device. These icons may be displayed above the corresponding objects in the image respectively for user selection. When the user clicks on one icon, it may mean that the user selects the icon, and the corresponding position of the icon selected by the user in the image may be determined. That is, the image area corresponding to the icon selected by the user may be determined as the first target area. The second data corresponding to the first target area may be determined, and then the first target image may be displayed based on the second data, such that the first target image is presented with the second effect to achieve image update. That is, the presentation effect of the first target image may be updated.

In one embodiment, after the first target area is determined, the image data or image pre-photographed corresponding to the first target area may be determined as the second data.

At S103, the first target image is displayed based on the second data, such that the first target image is presented with the second effect.

The first data and the second data may be stored in association with the first target image. The first data may be generated before the first target image is displayed, and the second data may be generated before the first target image is displayed. In one embodiment, each object in the first data may be associated with one piece of the second data, and the first data and the second data may be obtained in advance through the photographing module.

The second effect may be the effect of displaying the first target image in the form of the second data. The second data may be image data corresponding to one image of a pre-photographed image group including a plurality of images or one image of image data obtained by merging a plurality of images that is able to highlight the first target area. In one embodiment, the second effect may be an effect obtained by enhancing the brightness of the first target area for photographing, or an effect obtained by blurring the area other than the certain area for photographing.

In one embodiment, after the first target image is presented with the second effect, the user may also click an image save button to save the currently displayed first target image. After saving, when the image display interface of the electronic device is opened again, the image displayed by the image display interface may be the first target image saved last time. In one embodiment, when the user clicks the save button, the currently displayed first target image may be saved in the joint photographic expert group (JPEG) format, the PNG format, or a custom format, in the electronic device, and there is no limitation on the saving format here. As shown in FIG. 2, when the image update is completed, the user may choose to click the save button to store the currently displayed first target image in the electronic device in the JPEG format, the PNG format or a custom format.

In the processing method provided by the present disclosure, the first target image may be displayed based on the first data such that the first target image is presented with the first effect. The second data may be determined based on the first target area. And then, the first target image may be displayed based on the second data such that the first target image is presented with the second effect. Therefore, multiple pieces of effect data stored in association with the target image that is actually photographed may be called. The target image may be presented with the first effect or switched to be presented with the second effect, which may enrich the image display method and improve the user experience. Further, both the first data and the second data may be obtained by photographing. Therefore, the processing method of the present disclosure may achieve switching between different display effects that are actually photographed by changing the currently displayed image data of the photographed image or the image after photographing.

In one embodiment, the first data may be obtained through the photographing module; and the second data may be obtained through the photographing module. The photographing module may be a photographing module of the electronic device that displays the first target image. For example, in one embodiment, the electronic device that displays the first target image may be a mobile phone, and the photographing module may be a camera of the mobile phone. The photographing module may also be an image capturing device different from the electronic device displaying the first target image. For example, in another embodiment, the electronic device displaying the first target image may be a mobile phone, and the photographing module may be a camera different from the mobile phone. After the camera captures multiple sets of images, the multiple sets of images may be transferred to the mobile phone.

In one embodiment, the first data may be the first image, and the second data may be a second image. Correspondingly, the processing method may include SA1 to SA3.

At SA1, the first image may be displayed as the first target image such that the first target image is presented with a third effect.

The first target image may include a pre-photographed image group including a plurality of images, and the plurality of images in the image group may be all collected by the photographing module. The first image may be one image in the image group.

The third effect may include but is not limited to an image effect captured under natural light or image effects captured by the photographing module under different operating parameters. For example, in one embodiment, the third effect may include highlighting the first target image in the form of the first image. For example, the third effect may be an effect obtained by enhancing the brightness of the area corresponding to the first image, or may be an effect obtained by blurring the area other than the area corresponding to the first image.

Each object in the first target image may correspond to one or more images with different effects, and one object may correspond to the first image. For example, the photographing module may collect the corresponding images after enhancing the brightness of the area where an object A is located, and the image corresponding to the object A may be the first image. Therefore, the first image corresponding to the object A may be displayed as the first target image, and the third effect may be the effect of enhancing the brightness of the area where the object A is located.

At SA2, the second image may be determined based on a second target area, where the first target image may include the second target area.

In one embodiment, the second target area may be determined in the first target image according to the user's selection, and the second image corresponding to the second target area may be determined from the pre-photographed image group including the plurality of images in the first target image. The method of determining the second target area may be the same as the method of determining the first target area, and will not be described again here.

After the second target area is determined, the image corresponding to the second target area in the pre-photographed image group including the plurality of images in the first target image may be determined as the second image.

At SA3, the second image may be displayed as the first target image such that the first target image is presented with a fourth effect. The first image and the second image may be stored in association with the first target image. The first image may be generated before displaying the first target image, and the second image may be generated before displaying the first target image.

In one embodiment, each object in the first image may be associated with one second image, and the first image and the second image may be captured in advance by the photographing module.

The fourth effect may be an effect of displaying the second image as the first target image. The second image may be an image that is able to highlight the second target area. In one embodiment, the fourth effect may be an effect obtained by enhancing the brightness of the second target area for photographing, or may be an effect obtained by blurring the area other than the second target area for photographing.

In some embodiments, the processing method may further include SB1 to SB3.

At SB1, the photographing module may be used to obtain an original image and a target area in the original image may be determined. The target area in the original image is also referred to as an "original target area."

In one embodiment, the photographing module may collect the original image for a target scene that includes a plurality of objects. An image area corresponding to each object in the original image may be determined as one target area.

At SB2: first operating parameters of the photographing module may be determined according to the display effect of each target area.

In one embodiment, the first operating parameters may include at least a second operating parameter of a light-emitting unit. The light emitting unit may be a flash array including at least two flash units. The first operating parameter may include the arrangement, brightness value or luminous color of each flash unit. The first operating parameters may also include equipment parameters of the photographing module itself, such as aperture, shutter, sensitivity, focal length, focus mode or model, etc.

For each target area, the photographing parameters of the object corresponding to the target area in the target scene may be determined based on the display effect of the target area in the original image, such as the degree of brightness or the degree of blur of the target area, etc., as the first operating parameters of the photographing module. For example, when the target area is relatively dark, the number of flash units corresponding to the target area may be set as the first operating parameters of the photographing module to brighten the target area. For another example, the target area may have a relatively high degree of blur. To reduce the degree of blur, the focal length or aperture parameter corresponding to the photographing module may be set as the first operating parameters of the photographing module.

At SB3, the photographing module may be controlled to perform photographing based on the first operating parameters, to obtain a data set including effect data corresponding to the target areas as the first data set corresponding to the first target image. The first data and the second data may belong to the first data set. The first data set is also referred to as a "target data set"

For the object in each target area in the original image, after setting the photographing parameters of the photographing module to the first operating parameters corresponding to the object, the image of the target scene may be photographed to obtain a plurality of images. The data of the plurality of images may be used as the first data set corresponding to the first target image, or the image data may be stored in the form of images to obtain the corresponding image set including the plurality of images.

In one embodiment, any set of image data in the first data set may be used as the first data, thereby presenting the first target image with the corresponding first effect, or any image in the image set may be used as the first image, such that the first target image is presented with the corresponding third effect.

In one embodiment, at least one set of effect data corresponding to the third target area and at least one set of effect data corresponding to the fourth target area may be determined in the first data set for processing to determine the third data.

In one embodiment, the currently presented first target image may include a third target area and a fourth target area. When the user selects the two target areas at the same time, that is, when the user selects the third target area and the fourth target area at the same time, the data corresponding to the third target area and the data corresponding to the fourth target area may be obtained, and the two sets of data may be merged and adjusted to obtain the third data.

After the third data is obtained, the first target image may be displayed based on the third data such that the first target image is presented with a fifth effect. In one embodiment, the fifth effect may be an effect of enhancing the brightness of the third target area and the fourth target area, or may be an effect of blurring areas other than the third target area and the fourth target area.

In another embodiment, when the image data is stored in the form of images, the currently presented first target image may include the third target area and the fourth target area. When the user selects the two target areas at the same time, that is, when the user selects both target areas at the same time, the image corresponding to the third target area and the image corresponding to the fourth target area may be obtained, and the two images may be merged. For example, on the premise of retaining the third target area and the fourth target area, other areas of the two images may be superimposed, and the resulted new image may be used as the third data. After the third data is obtained, the new image may be displayed as the first target image such that the first target image is presented with the fifth effect. In one embodiment, the fifth effect may be enhancing the brightness of the third target area and the fourth target area.

In one embodiment, after obtaining the first data set corresponding to the first target image, the user may select a set of data from the first data set as a main image, or determine data corresponding to the target object by determining the target object, as the main image. For example, when opening the image display interface of the electronic device, the image initially displayed on the electronic display interface may be the main image. The main image may be an image taken in natural light.

Figure 3:
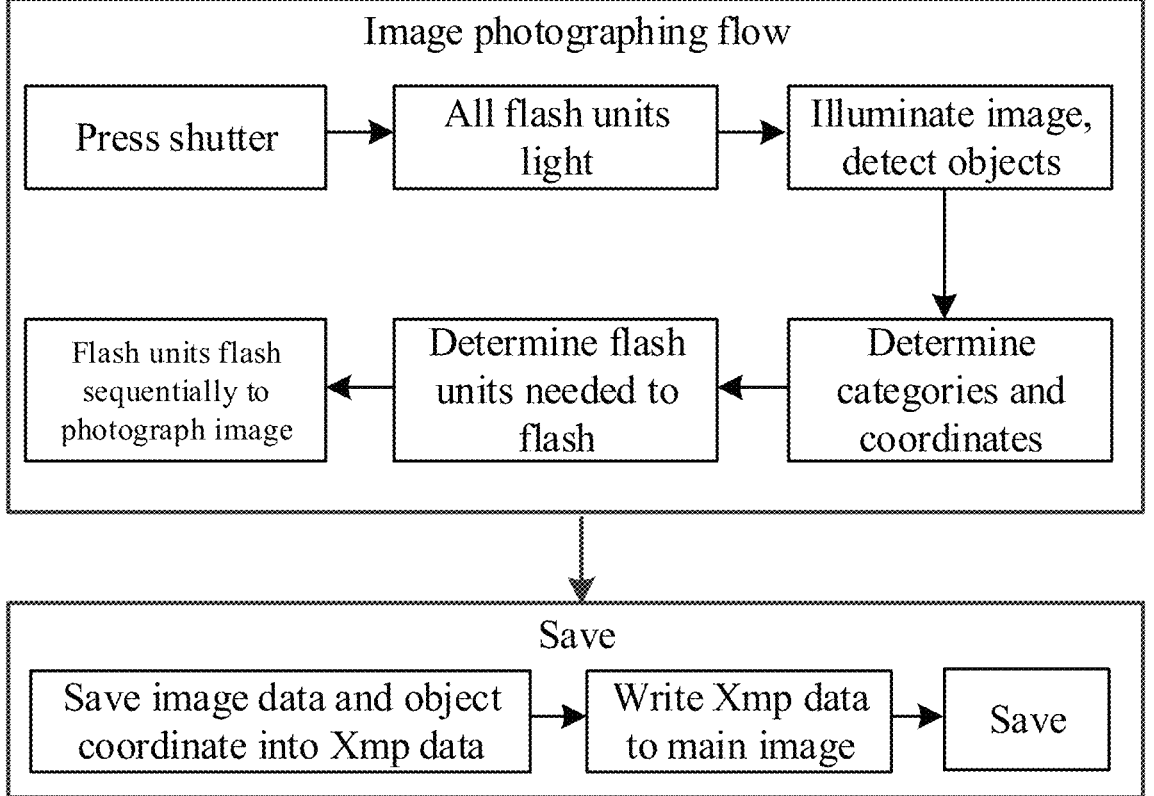
FIG. 3 is a schematic diagram showing image processing consistent with the present disclosure.

In one embodiment shown in FIG. 3, which is a schematic diagram showing image processing, the user may capture images by pressing the shutter of the photographing module. For example, the original image may be collected when the flash units are all turned on, that is, when the scene is illuminated by all flash units. Then, the information of objects in the original image may be detected after the screen is illuminated. For example, an object detection algorithm may be used to analyze the categories and coordinate information of the objects included in the original image. For example, when the original image includes people, animals, plants, buildings, etc., the coordinate information of the people, animals, plants, buildings, etc. included in the original image may be further determined and recorded. Then the flash unit corresponding to each object that needs to flash may be determined based on the category and coordinate information of each object. The photographing module may send multiple photo requests to the bottom layer of the system. Each photo request may parameters corresponding to the index of the flash unit, such that the flash units corresponding to objects under different categories and coordinate information are allowed to emit light and images corresponding to the objects are captured during each photographing process. Therefore, the flash units may be flashed in sequence to capture images to obtain the plurality of images. After obtaining the plurality of images, the plurality of images may be saved. For example, each image may be associated with the coordinate information of the object corresponding to the image or the category of the object, which may be jointly encoded and saved as Xmp attributes, BMP attributes or Custom attribute image data. The main image may be determined from the saved Xmp attribute, BMP attribute or custom attribute image data, and the image data associated with the main image information may be saved the electronic device again. When needing to read the saved image data, decoding may be performed on the image data with Xmp attributes, BMP attributes or custom attributes. In another embodiment, after obtaining the plurality of images, each image may be associated with the coordinate information of the object corresponding to the image or the category of the object corresponding to the image. The main image may be determined from the plurality of images. The main image information, each image, and the coordinate information of the object corresponding to the image and the category of the object corresponding to the image may be stored in correlation in the electronic device, that is, the plurality of images and the correlation information of the plurality of images may be stored in the electronic device without encoding and decoding the images, for convenient image display.

In the present disclosure, the user may select the areas where the plurality of objects in the currently displayed image is located, merge and generate new images or new image data based on the captured image data corresponding to each object, and may also switch to the corresponding effect to present the target image, further enriching the image display effect and improving user experience.

Figure 4:
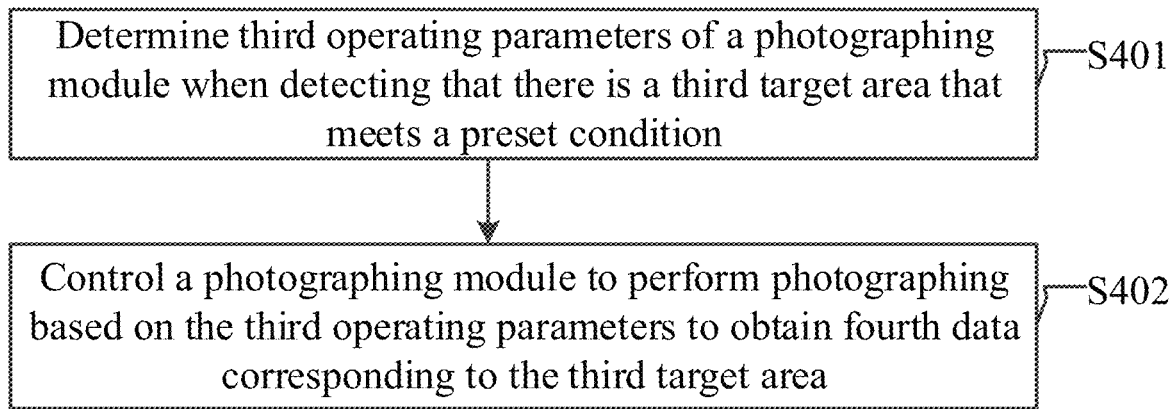
FIG. 4 is a flowchart of another processing method consistent with the present disclosure.

In another embodiment shown in FIG. 4, which is a flowchart of another processing method provided by the present disclosure, the processing method includes S401 to S401 and S402.

At S401, a third target area meeting a preset condition is detected and third operating parameters of the photographing module are determined.

In one embodiment, the preset condition may include but is not limited to situations where the presenting effect is not good, such as the brightness is lower than a preset brightness threshold, the degree of blur is higher than a preset blur range, or the contrast is higher than a preset contrast threshold, etc. The preset brightness threshold, the preset blur range, and the preset contrast threshold may be set according to the actual application scenario, and are not limited here. For example, when the preset condition is that the brightness is lower than the preset brightness threshold, the image acquisition device may collect the original image A of the target scene, and the brightness of the area where the object B is located in the original image A may be lower than the preset brightness threshold. Therefore, the area where the object B is located may be set as the target area. The photographing module may be a photographing module of a mobile phone, a photographing module of a camera, a photographing module of a computer, etc.

In one embodiment, the third operating parameters may include at least a second operating parameter of a light-emitting unit. The light emitting unit may be a flash array including at least two flash units. The third operating parameters may include the arrangement, brightness value or luminous color of each flash unit. The third operating parameters may also include equipment parameters of the photographing module itself, such as aperture, shutter, sensitivity, focal length, focus mode or model, etc.

In one embodiment, the light-emitting unit may include a light-emitting array including a plurality of flash units, and the method may further include: determining at least one flash unit in the light-emitting array according to the target area, where the flash unit corresponds to the target area. One or more flash units may form a light-emitting sub-unit. For example, the target area A may correspond to one light-emitting sub-unit M, where the light-emitting sub-unit unit M corresponds to the flash unit N1 and the flash unit N2. To enhance the brightness of the target area A, the photographing module may turn on the corresponding flash unit N1 and flash unit N2 when photographing an image. Therefore, the flash unit N1 and the flash unit N2 may illuminate the target area A to enhance the brightness of the target area A. In one embodiment, the photographing module may be a photographing module of an electronic device that displays images. For example, in one embodiment, the electronic device that displays images may be a mobile phone, and the photographing module may be a photographing module of the mobile phone. In other embodiments, the photographing module may also be a photographing module of a camera or a photographing module of a computer.

Figure 5:
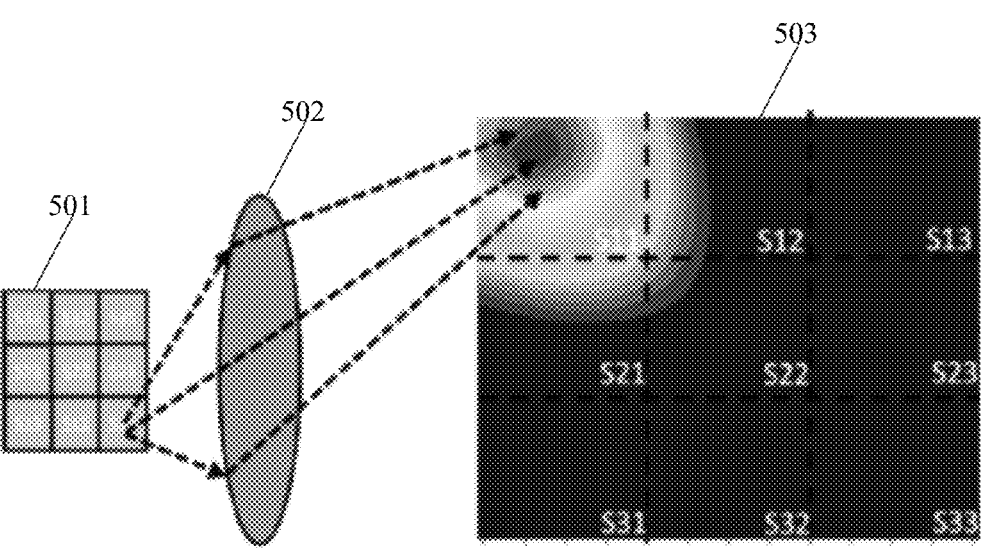
FIG. 5 is a schematic diagram showing correspondence of a flash light array and an image region, consistent with the present disclosure.

In one embodiment, when each flash unit of the flash of the image acquisition device is turned on, the original image of the target scene may be collected. Each object in the original image may be identified, and the identification information of each object may be determined. The identification information of one object may be information that represents the location of the object, such as coordinate information of the object or an identifier associated with the location of the object. Then, the photographing parameters corresponding to each object in the target scene may be determined based on the identification information. In one embodiment, for each object in the original image, the degree of overlap between the identification information of the object and the camera imaging area corresponding to each flash unit may be determined. One flash unit with the highest degree of overlap may be determined as the flash unit of the object, and the flash unit of the object may be used as the third operating parameter corresponding to the object. In one embodiment as shown in FIG. 5 showing a correspondence diagram between the flash array and the image area, the flash array 501 includes 9 flash units including flash units S11-S33. Each flash unit corresponds to one area in the original image 503 collected for the target scene. For example, each flash unit identified by one identifier in each area divided in the original image 503 is the flash unit corresponding to the image area. The image area in the upper left corner of the original image 503 corresponds to the flash unit S11, then the image acquisition device may turn on the flash unit S11 when highlighting and capturing the object corresponding to the image area in the upper left corner of the original image 503, and the light of the flash unit S11 is refracted through the lens 502 and radiated at the object corresponding to the image area in the upper left corner of the original image 503. The image acquisition device receives the light reflected back from the object and then performs photosensitization to realize the acquisition of image data or images corresponding to the object. As shown in FIG. 5, in one embodiment, one or more flash units may form one light emitting sub-unit. For example, the areas in the original image 503 corresponding to S31, S32 and S33 may together form the target area A, and the target area A may correspond to one light-emitting sub-unit M. Therefore, the flash unit S31, the flash unit S32 and the flash unit S33 may jointly correspond to the light-emitting sub-unit M.

A plurality of photosensitive sub-units in the image acquisition device may form a photosensitive array. The plurality of photosensitive sub-units in the photosensitive array may correspond to the light-emitting sub-units in a one-to-one manner, and also correspond to each target area of the original image respectively. In one embodiment, one photosensitive sub-unit of the photosensitive array may be determined according to the target area and the photosensitive sub-unit may correspond to the target area. The photographing module may receive the light reflected from the target area, and the photosensitive sub-unit may sense the light to collect the light, to capture the corresponding image.

In one embodiment, the display array of the display module of the electronic device may also include a plurality of display sub-units, and each sub-display unit may correspond to the target area. The display array may display the collected image of the target area. In one embodiment, the identification options of the display array may be presented to the user for selection, and the display interface of the electronic device may display the image of the target area corresponding to the display array according to the identification of the display array selected by the user.

The corresponding manner between the photosensitive sub-units in the photosensitive array and each target area of the original image may be similar to the corresponding manner between the light-emitting sub-units and each target area of the original image. The corresponding manner between the display sub-units in the display array and each target area may be similar to the corresponding manner between the light-emitting sub-units and each target area of the original image.

At S402, the photographing module is controlled to photograph based on the third operating parameters to obtain fourth data including the third target area.

In one embodiment, the photographing parameters of the photographing module may be adjusted to the third operating parameter, the image of the target environment including the object corresponding to the third target area may be photographed with the third operating parameter, and the obtained image or the image data obtained by processing the obtained image may be determined as the fourth data.

The third operating parameters may at least include the operating parameters of one light-emitting unit and the illuminated space of the light-emitting unit may partially coincide with the photographing space of the photographing module. For example, the light-emitting unit may illuminate a certain area or an area where a certain object is located in the photographing space, to change the brightness of the area in the image captured by the photographing module and achieve the effect of changing the local or overall brightness of the image captured by the photographing module. The illuminated space of the light-emitting unit may at least include a space corresponding to the third target area. In one embodiment, there may be a corresponding relationship between the illuminated space of the light-emitting units and the target areas, and each light-emitting unit may correspond to one target area of the original image, and the target area of the original image may include the third target area.

In some embodiments, the method may further include:

SC1: obtaining a third data set including fourth data where the third data set includes a plurality of different image data; and SC2: obtaining different operating parameters of the photographing module for obtaining each image data, where any group of data in the third data set is determined as fifth data.

In one embodiment, the user may collect the original image when all the flash units are turned on and the scene is illuminated, and the object detection algorithm may be used to analyze the categories of the main objects in the original image. For example, the original image may include people, animals, plants, buildings, etc. The location information of these objects in the original image may be recorded and identifiers that characterize the location of these objects may be determined. Then the flash required by the objects may be determined based on the identifiers of the objects. The camera application may send a plurality of photo requests to the bottom layer of the system. Each photo request may carry parameters corresponding to the index of the flash, such that different flash may be turned on for capturing the image during each photographing process. The captured image may be the fourth data. Xmp attributes, BMP attributes or custom attributes may be established for each piece of the fourth data, and the set of each piece of the fourth data after creating new attributes as the third data set. The type and location information of each object may be written into these attributes. The fifth data may be determined as the main image from each piece of the image data in the third data set, and each piece of the fourth data may be encoded. The third data set including the fourth data after encoding and the main image information may be jointly stored in the electronic device.

In one embodiment, the operating parameters of the photographing module that obtains each piece of the image data may include the flash parameters, aperture parameters, focal length parameters, etc., of the photographing module.

In the present disclosure, when taking pictures, the third operating parameter of the photographing module may be used to highlight the main object (the target area) in the photographing scene. Therefore, subsequently, the user may be able to re-select images with different effects according to his own needs and preferences after taking the photo, providing the data basis for freely switching the objects in the image that need to be highlighted.

In one embodiment, the method may also include SD1 to SD3.

At SD1, a second target image may be displayed based on the fifth data, such that the second target image is presented with a third effect.

At SD2, the fourth data may be determined based on the third target area; where the second target image includes the fourth target area.

In one embodiment, the third target area may be an area included in the second target image. The user may select an object or a designated position for the second target image, and the area corresponding to the selected object or the designated position may be used as the third target area. Then, the corresponding fourth data of the third target area may be determined from the pre-photographed third data set.

At SD3, the second target image may be displayed based on the fourth data, such that the second target image is presented with a fourth effect.

Therefore, the second target image may be presented by switching from the third effect to the fourth effect.

The fourth data may be stored in the form of an image, and the fourth effect may be overwriting the second target image with the fourth data stored in the form of an image to display the effect of the second target image. For example, the fourth effect may be an effect of enhancing the brightness of the fourth target area, or may be an effect of blurring areas other than the fourth target area.

The fourth data and the fifth data may be stored in association with the second target image. The fourth data may be generated before displaying the second target image, and the fifth data may be generated before displaying the second target image. For the generation of the fourth data and the fifth data, the reference may be made to the generation process of the fourth data and the fifth data at S402, which will not be described again here.

In the present disclosure, the operating parameters of the photographing module may be adjusted to collect images that are able to highlight or optimize the display effect of the target area, thereby providing real photographing data optimized for the target area. In the process of displaying the second target image, the display effect of the second target image may be switched by switching the real photographing data mode optimized for the target area.

Figure 6:
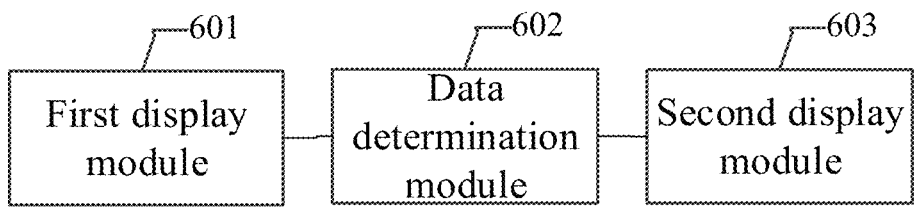
FIG. 6 is a schematic structural diagram showing a processing device consistent with the present disclosure.

The present disclosure also provides a processing device. As shown in FIG. 6, which is a schematic structural of a processing device, in one embodiment, the processing device includes:

a first display module 601, configured to display a first target image based on first data and present the first target image with a first effect, where the first target image includes a first target area;

a data determination module 602, configured to determine second data based on the first target area; and a second display module 603, configured to display the first target image based on the second data and present the first target image with a second effect.

The first data and the second data may be stored in association with the first target image. The first data may be generated before displaying the first target image, and the second data may be generated before displaying the first target image.

In the processing device provided by the present disclosure, the first target image may be displayed based on the first data and the first target image may be presented with the first effect. The second data may be determined based on the first target area. The first target image may be displayed based on the second data and the first target image may be presented with the second effect. That is, the first effect may be used to present the first target image and the second effect may be used to present the first target image, which enriches the image display method and improves the user experience.

In one embodiment, the first data may be obtained through a photographing module; and the second data may be obtained through the photographing module.

In one embodiment, the first data may be a first image, and the second data may be a second image. The first display module 601 may be configured to display the first image as the first target image, such that the first target image is presented with a third effect.

The data determination module 602 may be configured to determine the second image based on the second target area, where the first target image includes the second target area.

The second display module 603 may be configured to display the second image as the first target image and present the first target image with a fourth effect.

The first image, the second image and the first target image may be stored in association. The first image may be generated before the first target image is displayed, and the second image may be generated before the first target image is displayed.

In some embodiments, the processing device may further include:

an image acquisition module (not shown in the figure), configured to: obtain an original image using the photographing module and determine a target area in the original image; determine first operating parameters of the photographing module based on the display effect of the target area; control the photographing module to perform photographing based on the first operating parameters, to obtain a data set including effect data corresponding to the target area as the first data set corresponding to the first target image; and determine at least one set of effect data corresponding to the third target area and at least one set of effect data corresponding to the fourth target area in the first data set for processing to determine the third data. The first data and the second data may belong to the first data set. The first operating parameters may include at least second operating parameters of the light-emitting units.

Figure 7:
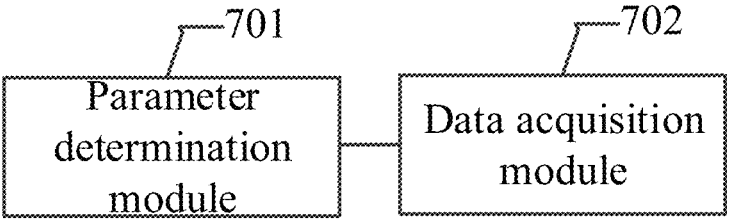
FIG. 7 is a schematic structural diagram showing another processing device consistent with the present disclosure.

Another embodiment of the present disclosure also provides another processing device. As shown in FIG. 7, the processing device may include:

a parameter determination module 701, configured to detect existence of a third target area that meets a preset condition and determine third operating parameters of the photographing module; and a data acquisition module 702, configured to control the photographing module to perform photographing based on the third operating parameters to obtain the fourth data corresponding to the third target area.

The third operating parameters may at least include operating parameters of the light-emitting unit. The illumination space of the light-emitting unit may partially coincide with the photographing space of the photographing module. The illuminating space of the light-emitting unit may at least include a space corresponding to the third target area.

In the processing device provided by the present disclosure, when taking pictures, the third operating parameter of the photographing module may be used to highlight the main object (the target area) in the photographing scene. Therefore, subsequently, the user may be able to re-select images with different effects according to his own needs and preferences after taking the photo, providing the data basis for freely switching the objects in the image that need to be highlighted.

In one embodiment, the light-emitting unit may include a light-emitting array including a plurality of flash units, and the device may further include a light-emitting unit determination module (not shown in the figure) configured to determine at least one flash unit in the light-emitting array according to the target area where the at least one flash unit corresponds to the target area.

In some embodiments, the processing device may further include:

a fifth data determination module (not shown in the figure), configured to obtain a third data set including the fourth data. The third data set may include different image data and the operating parameters of the data photographing modules for obtaining each piece of image data may be different. Any set of data in the third data set may be determined as the fifth data.

In some embodiments, the processing device may further include:

an image display module (not shown in the figure), configured to display a second target image based on the fifth data and present the second target image with a third effect; determine the fourth data based on the third target area, where the second target image may include the fourth target area; display the second target image based on the fourth data and present the second target image with a fourth effect. The fourth data and the fifth data may be stored in association with the second target image. The fourth data may be generated before displaying the second target image, and the fifth data may be generated before displaying the second target image.

The present disclosure also provides an electronic device and a readable storage medium.

Figure 8:
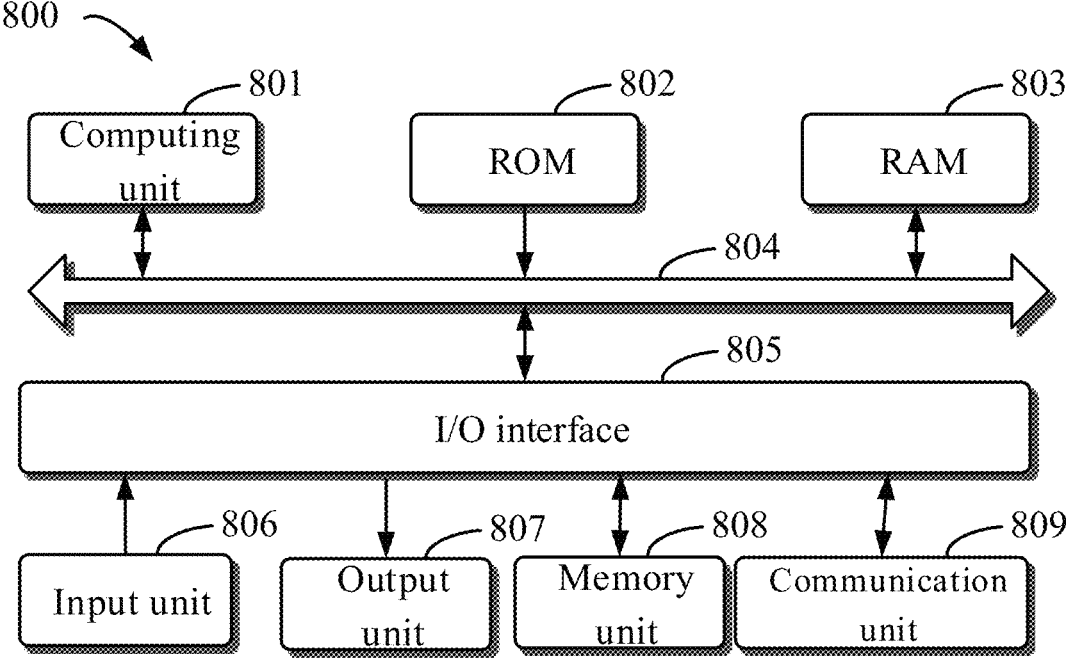
FIG. 8 is a schematic structural diagram showing an electronic device consistent with the present disclosure.

FIG. 8 shows a schematic structural diagram of an electronic device 800 which may be used to implement any embodiments of the present disclosure. The electronic device may include various forms of digital computers, such as laptop computers, desktop computers, workstations, personal digital assistants, servers, blade servers, mainframe computers, or any other suitable computers. The electronic device may also include various forms of mobile devices, such as personal digital assistants, cellular phones, smart phones, wearable devices, or other similar computing devices. The components shown herein, their connections and relationships, and their functions are used as examples only for illustrating the present disclosure, and do not limit the scope of the present disclosure.

As shown in FIG. 8, in one embodiment, the device 800 includes a computing unit 801 that is able to execute various appropriate actions or processes, according to a computer program stored in a read-only memory (ROM) 802 or loaded from a storage unit 808 into a random access memory (RAM) 803. The RAM 803 may also store various programs and data required for the operation of the electronic device 800. The computing unit 801, the ROM 802 and the RAM 803 may be connected to each other via a bus 804. An input/output (I/O) interface 805 may be also connected to the bus 804.

Components in the electronic device 800 connected to the I/O interface 805, may include: an input unit 806, such as a keyboard, mouse, etc.; an output unit 807, such as various types of displays, speakers, etc.; a storage unit 808, such as a magnetic disk, optical disk, etc.; and a communication unit 809, such as a network card, modem, wireless communication transceiver, etc. The communication unit 809 may allow the electronic device 800 to exchange information/data with other devices through computer networks such as the Internet and/or various telecommunications networks.

The computing unit 801 may be a variety of general and/or special purpose processing components having processing and computing capabilities. Some examples of the computing unit 801 include, but are not limited to, a central processing unit (CPU), a graphics processing unit (GPU), various dedicated artificial intelligence (AI) computing chips, various computing units running machine learning model algorithms, digital signal processing processor (DSP), or any other appropriate processor, controller, microcontroller, etc. The computing unit 801 may implement various methods and processes described in above embodiments, such as the processing methods. For example, in some embodiments, the processing method presented by various embodiments of the present disclosure may be implemented as a computer software program that is tangibly embodied in a machine-readable medium, such as the storage unit 808. In some embodiments, part or all of the computer program may be loaded and/or installed onto the electronic device 800 via the ROM 802 and/or communication unit 809. When the computer program is loaded into the RAM 803 and executed by the computing unit 801, one or more steps of the processing method provided by various embodiments of the present disclosure may be performed. In other embodiments, the computing unit 801 may be configured to perform the processing method in any other suitable manner (for example, by means of firmware).

Various implementations of systems and technologies in the present disclosure may be implemented in digital electronic circuit systems, integrated circuit systems, field programmable gate arrays (FPGAs), application specific integrated circuits (ASICs), application specific standard products (ASSPs), systems on a chip (SOCs), complex programmable Implemented in programmed logic devices (CPLDs), computer hardware, firmware, software, and/or combinations thereof. These various embodiments may include implementation in one or more computer programs executable and/or interpreted on a programmable system including at least one programmable processor. The programmable processor may be a special purpose or general purpose programmable processor, may receive data and instructions from a storage system, at least one input device, or at least one output device, and transmit data and instructions to the storage system, the at least one input device, or the at least one output device.

Program codes for implementing the methods of the present disclosure may be written in any combination of one or more programming languages. These program codes may be provided to a processor or controller of a general-purpose computer, special-purpose computer, or other programmable data processing device, such that the program codes, when executed by the processor or controller, cause the functions/operations specified in the flowcharts and/or block diagrams are implemented. The program codes may execute entirely on the machine, partly on the machine, as a stand-alone software package, partly on the machine and partly on a remote machine or entirely on the remote machine or server.

The machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, devices or apparatus, or any suitable combination thereof. More specific examples of the machine-readable medium may include one or more wire-based electrical connection, laptop disk, hard drive, random access memory (RAM), read only memory (ROM), erasable programmable read only memory (EPROM or flash memory), optical fiber, portable compact disk read-only memory (CD-ROM), optical storage device, magnetic storage device, or any suitable combination of the above.

To provide interaction with a user, the systems and techniques described herein may be implemented on a computer. The computer may include a display device (such as a CRT (cathode ray tube) or LCD (liquid crystal display) monitor) for displaying information to the user); and a keyboard and pointing device (e.g., a mouse or a trackball) through which the user can provide input to the computer. Other kinds of devices may also be used to provide interaction with the user; for example, the feedback provided to the user may be any form of sensory feedback (e.g., visual feedback, auditory feedback, or tactile feedback); and may be provided in any form, including acoustic input, speech input, or tactile input) to receive input from the user.

The systems and techniques described herein may be implemented in a computing system that includes back-end components (e.g., as a data server), or a computing system that includes middleware components (e.g., an application server), or a computing system that includes front-end components (e.g., a user's computer having a graphical user interface or web browser through which the user can interact with implementations of the systems and technologies described herein), or any computing system including combination of these backend components, middleware components, front-end components. The components of the system may be interconnected by any form or medium of digital data communication (eg, a communications network). Examples of communication networks include: local area network (LAN), wide area network (WAN), or the Internet.

The computer systems may include clients and servers. Clients and servers may be generally remote from each other and typically interact over a communications network. The relationship of client and server is created by computer programs running on corresponding computers and having a client-server relationship with each other. The servers may be a cloud server, a distributed system server, or a server combined with a blockchain.

Reordering, step addition or deletion may be performed on the various forms of processes shown above. For example, each step described in the present disclosure may be executed in parallel, sequentially, or in a different order, as long as the desired results of the technical solution disclosed in the present disclosure can be achieved. The present disclosure has no limit on this.

In addition, the terms "first" or "second" are used for descriptive purposes only and cannot be understood as indicating or implying relative importance or implicitly indicating the quantity of indicated technical features. Thus, features defined as "first" or "second" may explicitly or implicitly include at least one of these features. In the description of the present disclosure, "plurality" may means two or more than two, unless otherwise expressly and specifically limited.

Various embodiments have been described to illustrate the operation principles and exemplary embodiments. It should be understood by those skilled in the art that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but may be embodied in other equivalent forms without departing from the scope of the present disclosure.

What is claimed is:

1. An image display method comprising:
    displaying a target image based on first data, to present the target image with a first effect, the target image including a first target area;
    determining second data based on the first target area;
    displaying the target image based on the second data, to present the target image with a second effect;
    obtaining an original image using a photographing module, and determining an original target area in the original image;
    determining a first operating parameter of the photographing module according to a display effect of the original target area, the first operating parameter including at least a second operating parameter of a light-emitting unit;
    controlling the photographing module to perform photographing based on the first operating parameter, to obtain a data set including effect data corresponding to the original target area as a target data set corresponding to the target image, the first data and the second data belonging to the target data set; and
    determining, from the target data set, at least one set of effect data corresponding to a second target area and at least one set of effect data corresponding to a third target area for processing to determine third data;
    wherein:
        the first effect and the second effect are different image effects corresponding to a same scene content;
        the first data and the second data are stored in association with the target image; and
        the first data and the second data are generated before the target image is displayed.

2. The method according to claim 1, wherein:

the first data includes a first image, and the second data includes a second image;
the target area is a first target area;
the method further comprising:
    displaying the first image as the target image, to present the target image with a third effect;
    determining the second image based on the second target area, the target image including the second target area; and
    displaying the second image as the target image, to present the target image with a fourth effect;
    wherein:
        the first image and the second image are stored in association with the target image; and
        the first image and the second image are generated before the target image is displayed.

3. An electronic device comprising:
at least one processor; and
at least one memory storing at least one program that, when executed by the at least one processor, causes the at least one processor to perform the method according to claim 1.

4. The electronic device according to claim 3, wherein:
the first data includes a first image, and the second data includes a second image;
the at least one program, when executed by the at least one processor, further causes the at least one processor to:
    display the first image as the target image, to present the target image with a third effect;
    determine the second image based on the second target area, the target image including the second target area; and
    display the second image as the target image, to present the target image with a fourth effect;
the first image and the second image are stored in association with the target image; and
the first image and the second image are generated before the target image is displayed.

5. The method according to claim 1, wherein each of the first effect and the second effect includes an illumination effect resulting from photographing under different operating parameters of the photographing module, or a background-blurring effect outside the target area.

6. The method according to claim 1, wherein the first data and the second data are generated based on photographing the same scene content under different conditions.

7. A processing method comprising:
determining an operating parameter of a photographing module in response to detecting that a target area meeting a preset condition exists;
controlling the photographing module to perform photographing based on the operating parameter of the photographing module to obtain first data corresponding to the target area;
obtaining a data set including second data, the data set including a plurality of pieces of different image data;
obtaining different operating parameters of the photographing module for obtaining the plurality of pieces of different image data;
determining a set of data in the data set as third data;
displaying a target image based on the third data, to present the target image with a first effect;
determining fourth data based on the target area; and
displaying the target image based on the fourth data, to present the target image with a second effect;
wherein:

the operating parameter of the photographing module at least includes an operating parameter of a light-emitting unit that causes an illuminated space of the light-emitting unit to be smaller than a photographing space of the photographing module and include a space corresponding to the target area;

the fourth data and the third data are stored in association with the target image; and the fourth data and the third data are generated before the target image is displayed.

8. The method according to claim 7, wherein the light-emitting unit includes a light-emitting array including a plurality of flash units; and the method further comprising:

determining at least one flash unit in the light-emitting array according to the target area, the at least one flash unit corresponding to the target area.

9. An electronic device comprising:

at least one processor; and at least one memory storing at least one program that, when executed by the at least one processor, causes the at least one processor to perform the method according to claim 5.

10. The electronic device according to claim 9, wherein:

the light-emitting unit includes a light-emitting array including a plurality of flash units; and the at least one program, when executed by the at least one processor, further causes the at least one processor to:

determine at least one flash unit in the light-emitting array according to the target area, the at least one flash unit corresponding to the target area.

11. The method according to claim 7, wherein the preset condition is based on one or more image presenting effects including illumination, degree of blur, or contrast.

12. A processing method comprising:

displaying a target image based on first data, to present the target image with a first effect, the target image including a first target area, and the first data including a first image;

determining second data based on the first target area, the second data including a second image;

displaying the target image based on the second data, to present the target image with a second effect;

displaying the first image as the target image, to present the target image with a third effect;

determining the second image based on a second target area, the target image including the second target area;

displaying the second image as the target image, to present the target image with a fourth effect;

wherein:

the first data including the first image and the second data including the second image are stored in association with the target image; and the first data including the first image and the second data including the second image are generated before the target image is displayed.

* * * * *